Figure 1:
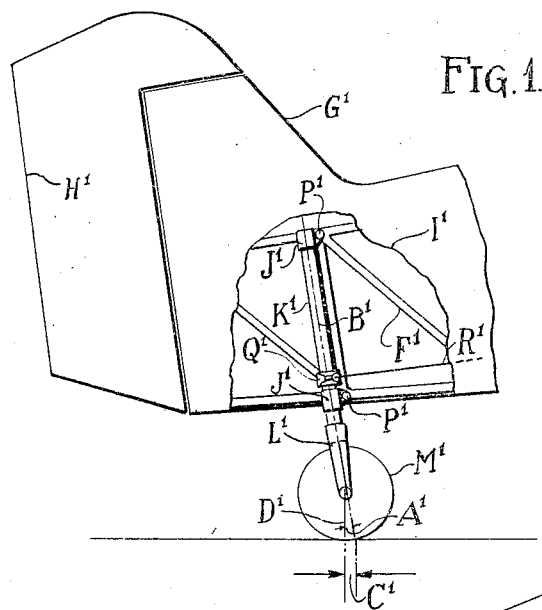

March 3, 1936. D. C. ROWE 2,032,718

TAIL WHEEL

Filed Jan. 3, 1933

INVENTOR.
DONALD C. ROWE.
BY
ATTORNEY

Patented Mar. 3, 1936

2,032,718

UNITED STATES PATENT OFFICE 2,032,718

TAIL WHEEL

Donald C. Rowe, Buffalo, N. Y., assignor to Curtiss Aeroplane & Motor Company, Inc., a corporation of New York Application January 3, 1933, Serial No. 649,799

1 Claim. (Cl. 244—2)

This invention relates to aircraft and more particularly to improvements in the arrangement of tail wheel mountings for airplanes.

Airplanes generally are equipped with a ground contact element toward the rear of the fuselage or body structure, adapted to provide means for ground contact when the craft is at rest, or is moving relatively slowly along the ground. This element may either be a shoe or a wheel, the latter being an improvement over the shoe, but in either case, the element is arranged to trail the craft, and to normally remain in line with the fore-and-aft axis of the craft. For convenience in ground manipulation of the craft, the tail element may be steerable, and may be adapted to pivot about an axis fixed in the fuselage of the craft. My invention contemplates a tail wheel arrangement wherein the tail wheel is mounted in a fork, the fork being held by a post pivoted for castering with respect to the aircraft. The novelty of the invention resides in the fact that the post, instead of slanting downwardly and rearwardly from the aircraft, as has been done in the past, slants downwardly and forwardly from the aircraft. The wheel axle may intersect, or may lie in front of or in back of the post axis, under certain conditions of geometrical design, to provide a castering tail wheel that will give easier steering characteristics, and as good, if not better stability of caster action, than previous designs.

An object, then, of the invention, is to provide a castering ground contact element having a caster pivot slanting downwardly and forwardly from an aircraft.

Another object is to provide a tail wheel adapted for castering and having the caster axis slanting downwardly and forwardly from said aircraft.

Another object is to provide a tail wheel pivot in an aircraft fuselage, normal to the flight thrust axis of the aircraft, and which, when the aircraft is resting on the ground, extends downwardly and forwardly from the aircraft.

Another object is to provide a tail wheel pivot in an aircraft fuselage, which may be attached to the conventional rectilinear fuselage members without the necessity of providing extension structure in the fuselage, previously considered necessary to allow the tail wheel post to slant downwardly and rearwardly.

Still another object is to provide a tail wheel structure for an airplane in which the working stresses are reduced, permitting of a lighter fuselage and lighter tail wheel supporting members.

A still further object is to provide a tail wheel construction which gives greater stability on the ground and which at the same time, is light in weight and relatively simple to produce.

Further objects will be apparent from a reading of the subjoined specification and claim and from a consideration of the accompanying drawing.

Figure 2:
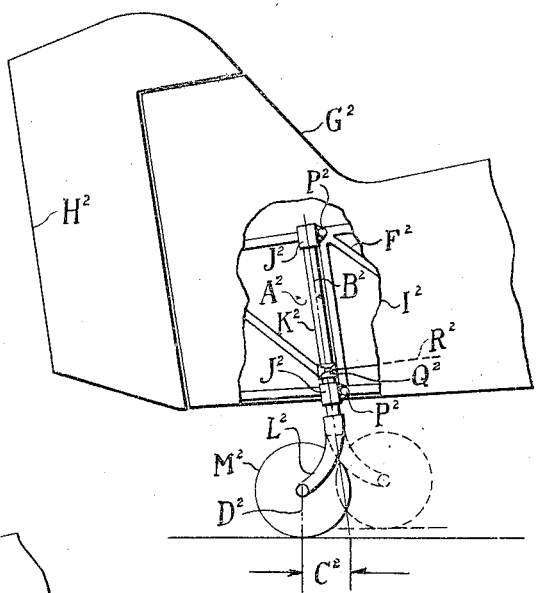
Figure 3:
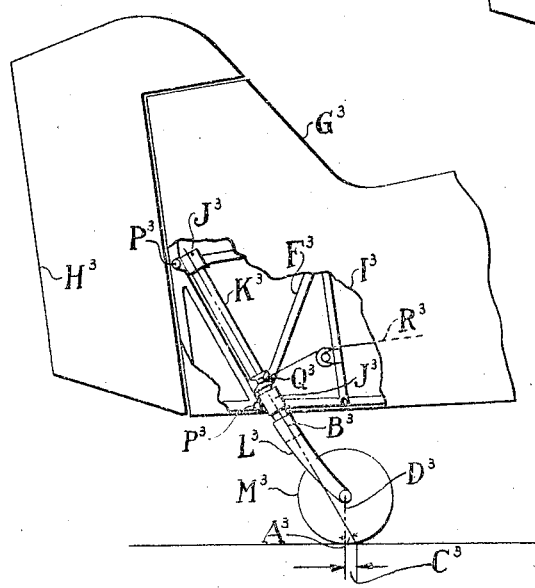

For a clearer understanding of the invention, reference may be made to the drawing, in which:

Figs. 1, 2 and 3 are side elevations of the rearward portion of an airplane partly broken away to show the tail wheel arrangement, and in which each of Figs. 1, 2 and 3 are variant embodiments of the same essential principles of my invention.

For convenience, similar parts in the figures bear similar letters, the exponential numbers indicating the figure corresponding to that in which the part bearing such letter appears.

In the detailed description following, the exponential indices will be mentioned only when the part designated thereby is being described with relation to the particular embodiment in which it is included. When exponential indices are omitted, the parts so described are to be assumed generic to all three embodiments.

In the drawing, F is the rearward portion of a skeleton fuselage of an aircraft, adapted to carry a vertical fin G and a rudder H. Said fuselage F is adapted to be enclosed by a covering I of fabric, wood or metal. A pair of bearings J, J are anchored on members of the fuselage F and carry for rotation therein a tail post K. The lower end of the tail post K carries a fork L, in which a tail wheel M is borne for rotation. The tail post axis is designated as B, and it will be noted that this axis slants downwardly and forwardly from the aircraft when the latter is in a ground contacting attitude. The intersection of the axis B with the ground is normally in advance of the point of contact with the ground of the wheel M by the caster dimension C, which construction tends to make the wheel M trail as the aircraft moves forwardly. The post axis B makes an angle A with a ground perpendicular D passing through the axis of the wheel M and the point of contact of said wheel with the ground.

In Fig. 1, the post axis B' is substantially normal to the flight thrust axis of the aircraft, but slants downwardly and forwardly with respect to the craft as a whole when the craft is on the ground. The axis B' intersects the line D' at the axis of the wheel M', by virtue of the straight fork L'. This results in a comparatively small caster dimension C', which, however, is adequate for causing a stable trailing of the wheel M'.

This construction, by the small dimension C', allows the craft to be easily pushed about on the ground.

In Fig. 2, the post axis $B^2$ is substantially normal to the flight thrust axis, as in Fig. 1. The fork $L^2$ is bent rearwardly, however, to effect a greater caster dimension $C^2$. In this case, the post axis $B^2$ intersects the ground perpendicular $D^2$ a substantial distance above the axis of the wheel $M^2$.

This construction of Fig. 2, with the larger caster dimension $C^2$, tends to give the wheel $M^2$ greater dynamic stability when the aircraft is moving than the construction of Fig. 1, but maneuvering of the craft on the ground would be somewhat more difficult, though not as much so as with the older conventional tail wheel, in which the post axis slants downwardly and rearwardly.

In both Figs. 1 and 2, the bearings J for holding the post axis B may be mounted to cross tubes P, lying one above the other and forming a normal and conventional part of the fuselage F.

In Fig. 3, the upper bearing $J^3$, is attached toward the upper rearward end of the fuselage $F^3$, while the lower bearing $J^3$ is attached to the bottom of the fuselage at a substantial distance forward of said first mentioned bearing.

With the post $K^3$ mounted in the bearings $J^3$, the axis $B^3$ has a noticeable downward and forward slant, making the angle $A^3$ with the ground perpendicular $D^3$. The fork $L^3$ is bent forwardly from the axis $B^3$, so that the axis $B^3$ intersects the ground perpendicular $D^3$, between the axis of the wheel $M^3$ and the ground. This results in a construction which has fair dynamic stability, and which is very easy to steer, should steering apparatus such as a lever $Q^3$ and control cables $R^3$ be arranged to turn the post $K^3$.

Steering apparatus comprising the lever Q attached to the tail post K, and cables R attached to said lever, may also be applied to the other embodiments.

While I have described my invention in detail in its present preferred embodiments, it will be obvious to those skilled in the art, after understanding my invention, that various changes and modifications may be made therein without departing from the spirit or scope thereof. I aim in the appended claim to cover all such modifications and changes.

What is claimed is:

In aircraft including a fuselage, a bearing in the rearward portion of said fuselage having its axis slanted downwardly and forwardly relative to the fuselage axis, a post mounted in said bearing for rotation, a tail wheel fork mounted on said post, said fork being so shaped that the forward end thereof lies forwardly of the post axis, and a tail wheel axle in said fork having its axis forward of that portion of the post axis nearest thereto.

DONALD C. ROWE.